(12) United States Patent
Iwata

(10) Patent No.: US 11,073,223 B2
(45) Date of Patent: Jul. 27, 2021

(54) FLUID CONTROL VALVE

(71) Applicant: CKD CORPORATION, Komaki (JP)

(72) Inventor: Toshio Iwata, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 16/803,246

(22) Filed: Feb. 27, 2020

(65) Prior Publication Data

US 2020/0318754 A1 Oct. 8, 2020

(30) Foreign Application Priority Data

Apr. 5, 2019 (JP) .............................. JP2019-072554

(51) Int. Cl.
*F16K 31/122* (2006.01)

(52) U.S. Cl.
CPC ................................ *F16K 31/1225* (2013.01)

(58) Field of Classification Search
CPC ............. F16K 31/1221; F16K 31/1225; F16K 31/1226
USPC ........................................................ 251/62
See application file for complete search history.

(56) References Cited

U.S. PATENT DOCUMENTS

| | | | | |
|---|---|---|---|---|
| 4,840,347 A * | 6/1989 | Ariizumi | ............. | F16K 31/1221 251/63.4 |
| 4,896,584 A * | 1/1990 | Stoll | ................... | F15B 15/1414 92/5 R |
| 4,903,939 A * | 2/1990 | Ariizumi | ............. | F16K 31/1221 251/63.4 |
| 5,186,434 A * | 2/1993 | Nishimura | ................ | F16K 7/14 251/331 |
| 2006/0175563 A1* | 8/2006 | Tsubota | .................... | F16K 7/14 251/25 |
| 2015/0369370 A1* | 12/2015 | Tanikawa | .................. | F16K 7/17 251/14 |
| 2017/0016544 A1* | 1/2017 | Chiba | ................. | F16K 31/1221 |

FOREIGN PATENT DOCUMENTS

JP 2015-108421 A 6/2015

\* cited by examiner

*Primary Examiner* — Umashankar Venkatesan
(74) *Attorney, Agent, or Firm* — Oliff PLC

(57) ABSTRACT

A fluid control valve includes a multi-stage piston actuator unit with first piston and second pistons coaxially and slidably arranged therein and a valve unit provided with an inlet port for inflow of a control fluid and an outlet port for outflow of the control fluid. The first and second pistons are slidable in a sliding direction perpendicular to an imaginary line connecting the center of the inlet port and the center of the outlet port. The multi-stage piston actuator unit has a smaller thickness in a direction perpendicular to the imaginary line and perpendicular to the sliding direction than the thickness of the valve unit in the direction perpendicular to the imaginary line and perpendicular to the sliding direction. The first and second pistons have either an elliptic or oval cross-section taken perpendicular to the sliding direction, the cross-section having a long axis parallel to the imaginary line.

2 Claims, 7 Drawing Sheets

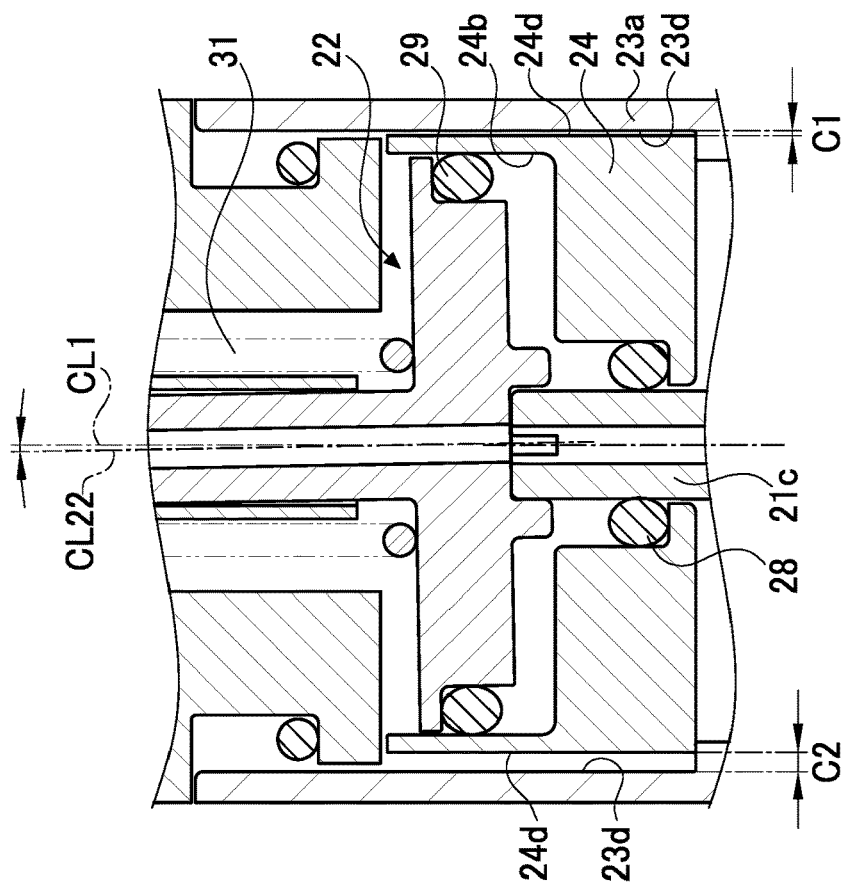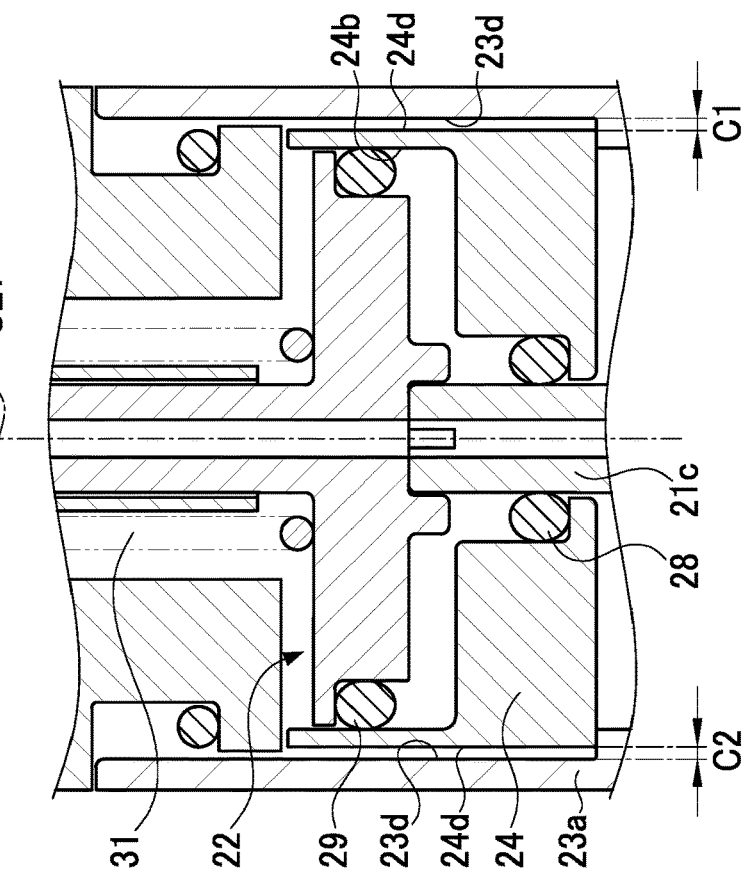

FLUID CONTROL VALVE

CROSS-REFERENCE TO RELATED APPLICATIONS

This application is based upon and claims the benefit of priority from the prior Japanese Patent Application No. 2019-072554 filed on Apr. 5, 2019, the entire contents of which are incorporated herein by reference.

BACKGROUND

Technical Field

The present disclosure relates to a fluid control valve including a multi-stage piston actuator unit in which a plurality of pistons coaxially and slidably installed and a valve unit having an inlet port for inflow of a control fluid and an outlet port for outflow of the control fluid.

Related Art

For gas control in a semiconductor manufacturing process, there have been used fluid control valves each including an actuator unit in which a piston is slidably installed and a valve unit operative to open and close a valve element in response to the sliding of the piston. In recent years, the number of the fluid control valves to be installed in a semiconductor manufacturing apparatus has been increasing to allow switching between various kinds of gasses to be supplied in the semiconductor manufacturing process. This increased number of fluid control valves leads to an increase in footprint of the semiconductor manufacturing apparatus. Therefore, downsizing of each fluid control valve has been demanded to reduce the installation area of each fluid control valve placed in the semiconductor manufacturing apparatus.

However, for ensuring valve opening and closing operations, the fluid control valve is required to reliably produce a necessary thrust of the piston. To produce such a necessary thrust of the piston, the piston needs to have a pressure-receiving surface with a large area to receive the pressure of an operating fluid. If the piston is increased in size to provide the large-area pressure-receiving surface, however, the size of the actuator unit is also increased, resulting in a large installation area of the fluid control valve.

Therefore, for example, Japanese unexamined patent application publication No. 2015-108421 discloses a fluid control valve 100 (see FIG. 7) in which six pistons, i.e., a first piston 101A to a sixth piston 101F, are installed coaxially to reduce the diameter of a columnar actuator unit V and also provide a sufficiently large area of the pressure-receiving surface of each piston. During use, such fluid control valves 100 are arranged side by side in a thickness direction (a depth direction in FIG. 7). In the example shown in FIG. 7, the diameter of the actuator unit V is set equal to or smaller than the thickness of the valve unit W (the dimension in the depth direction in FIG. 7). Accordingly, even if the fluid control valves 100 are arranged adjacently in the thickness direction, the actuator units V of the adjacent fluid control valves 100 do not interfere with each other, so that the fluid control valves 100 can be closely arranged without space therebetween. This can prevent an increase in the installation area of the fluid control valves 100. Since the first piston 101A to sixth piston 101F are identical pistons, those pistons are described hereinafter with a common reference sign 101 by appropriately omitting each last alphabet (the same applies to cylinders 102A to 102F, springs 104A to 104F, and O-rings 105A to 105F).

SUMMARY

Technical Problems

The foregoing conventional art has the following issues. The diameter of the columnar actuator unit V shown in FIG. 7 is substantially as small as the diameter of a generally-used pencil; however, such a small diameter of the actuator unit V results in a small diameter of each piston 101 installed therein. Accordingly, four or more pistons 101 have to be stacked to produce the sufficient thrust. In many cases, therefore, six pistons 101 would be stacked during use as shown in FIG. 7. The larger the number of the pistons 101 as above, the greater the number of cylinders 102 for installing therein the pistons 101. Furthermore, those cylinders 102 stacked in multiple stages do not have any means for combining with each other and thus need a means for fixing the cylinders 102 to each other. The actuator unit V also needs to be fixed to the valve unit W. For those purposes, a tubular housing 103 is required. This results in the large number of components of the actuator unit V, leading to an increased product cost.

The present disclosure has been made to address the above problems and has a purpose to provide a fluid control valve capable of reducing the number of components while providing a sufficient thrust of a piston to perform valve opening.

Means of Solving the Problems

To achieve the above-mentioned purpose, one aspect of the present disclosure provides a fluid control valve including: a multi-stage piston actuator unit including a plurality of pistons arranged coaxially and slidably within the multi-stage piston actuator unit; a valve unit provided with an inlet port configured to allow a control fluid to flow in the valve unit and an outlet port configured to allow a control fluid to flow out of the valve unit, wherein the pistons are slidable in a sliding direction perpendicular to an imaginary line connecting a center of the inlet port and a center of the outlet port, the multi-stage piston actuator unit has a thickness defined in a direction that is perpendicular to the imaginary line and also perpendicular to the sliding direction, the thickness being equal to or smaller than a thickness of the valve unit in the direction that is perpendicular to the imaginary line and also perpendicular to the sliding direction, and the plurality of pistons has either one of an elliptic cross-section and an oval cross-section, taken perpendicular to the sliding direction, the cross-section having a long axis extending parallel to the imaginary line.

The fluid control valve of the present disclosure configured as above provides the following operations and effects. The thickness of the multi-stage piston actuator unit is equal to or less than the thickness of the valve unit. Thus, even when fluid control valves are adjacently arranged in the thickness direction, the multi-stage piston actuator units of the adjacent fluid control valves do not interfere with each other, so that the fluid control valves can be closely arranged without space therebetween. This can prevent an increase in the installation area of the fluid control valves. In even such a multi-stage piston actuator unit with a reduced thickness, furthermore, since the plurality of pistons slidable in the multi-stage piston actuator unit is designed with either an elliptic or oval cross-section in the direction perpendicular to the sliding direction such that the long axis, or major axis, of the cross-section is parallel to the imaginary line connecting the center of the inlet port and the center of the outlet port, the pressure-receiving surfaces of the pistons for receiving the pressure of an operating fluid can each have a larger area than that of a conventional piston having e.g. a perfectly-circular cross-section without influencing the thickness of the multi-stage piston actuator unit. For instance, when the area of the pressure-receiving surface is set three times larger than the conventional one, the pistons stacked in two stages in the present disclosure can produce the thrust equal to the thrust obtained by the conventional pistons stacked in six stages. Reducing the number of stages of stacked pistons while sufficiently providing the thrust required for a valve opening operation can reduce the number of components of the fluid control valve 1 and thus reduce its product cost.

In a case where a piston is designed with an oval cross-section, its pressure-receiving surface is smaller in area than the pressure-receiving surface of an elliptic piston whose lengths in the longitudinal direction (i.e., the long or major axis direction) and in the lateral direction (i.e., the short or minor axis direction) are equal to those of the oval piston. However, such an oval piston can provide the following advantages when it is attached with an O-ring.

As shown in FIG. 7, for example, O-rings 105 are conventionally fitted on the outer peripheral surfaces of the pistons 101 to hermetically close each piston chamber. The inner diameter of each O-ring 105 is generally set smaller than the outer diameter of each piston 101 in order to prevent the O-rings 105 from dropping off from the corresponding pistons 101. Accordingly, each O-ring 105 attached to the pistons 101 is stretched to fit with the circumferential length of the pistons 101.

Herein, in the case of the elliptic piston having an elliptic cross-section, an O-ring attached to this piston may be stretched at a nonuniform stretch rate over the entire circumference. Thus, when the O-ring attached to the elliptic piston is compressed between the outer peripheral surface of the piston and the inner surface of the piston chamber, the O-ring may become deformed at a nonuniform compression rate. In contrast, the oval piston having an oval cross-section can advantageously reduce the nonuniformity of the stretch rate of the O-ring and thus reduce the nonuniformity of the compression rate.

BRIEF DESCRIPTION OF THE DRAWINGS

FIG. 6A is an enlarged view of the second piston and its surroundings in FIG. 2;

FIG. 6B shows the second piston that is tilted by an unbalanced biasing force of a spring acting on the second piston.

DETAILED DESCRIPTION OF THE EXEMPLARY EMBODIMENTS

A detailed description of an embodiment of a fluid control valve 1 of this disclosure will now be given referring to the accompanying drawings.

Figure 1:
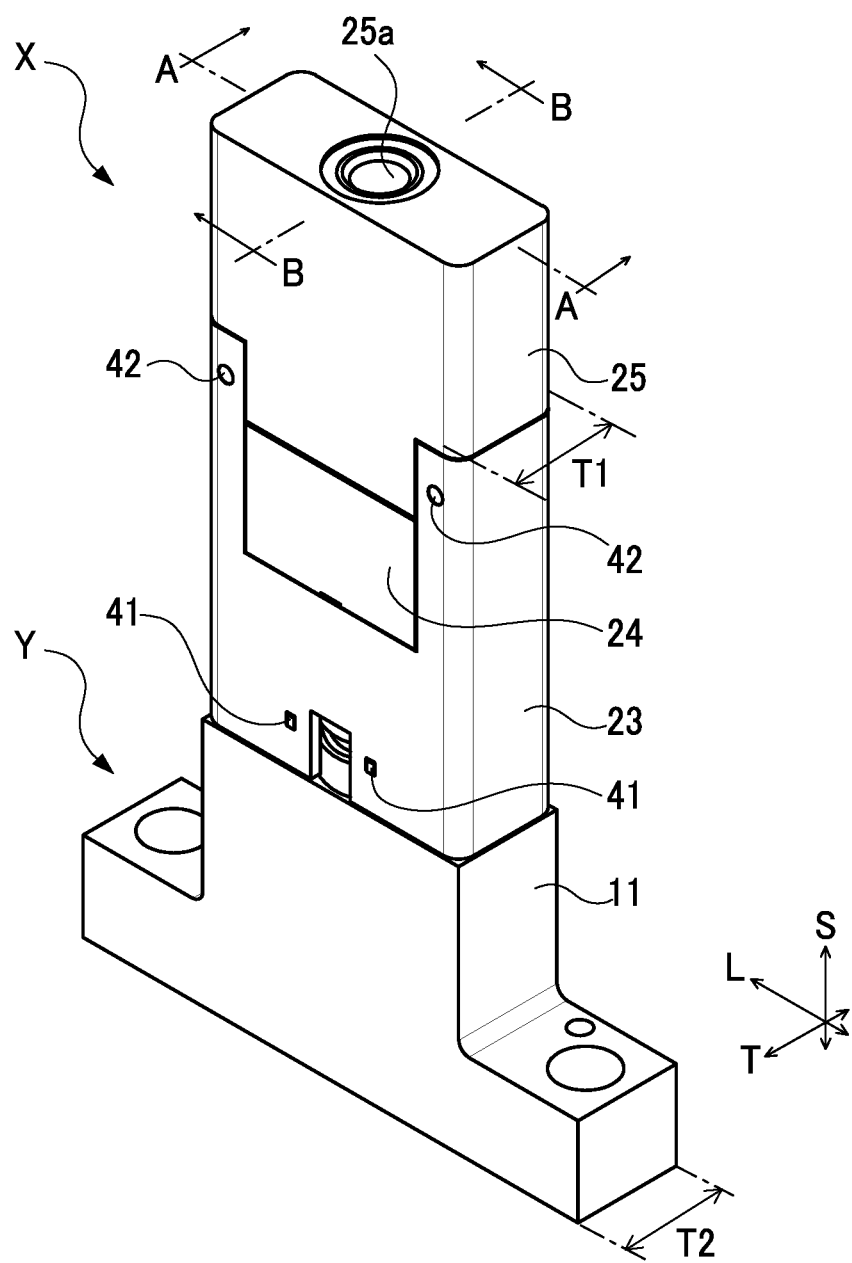
FIG. 1 is an external perspective view of a fluid control valve in an embodiment of the present disclosure.
Figure 2:
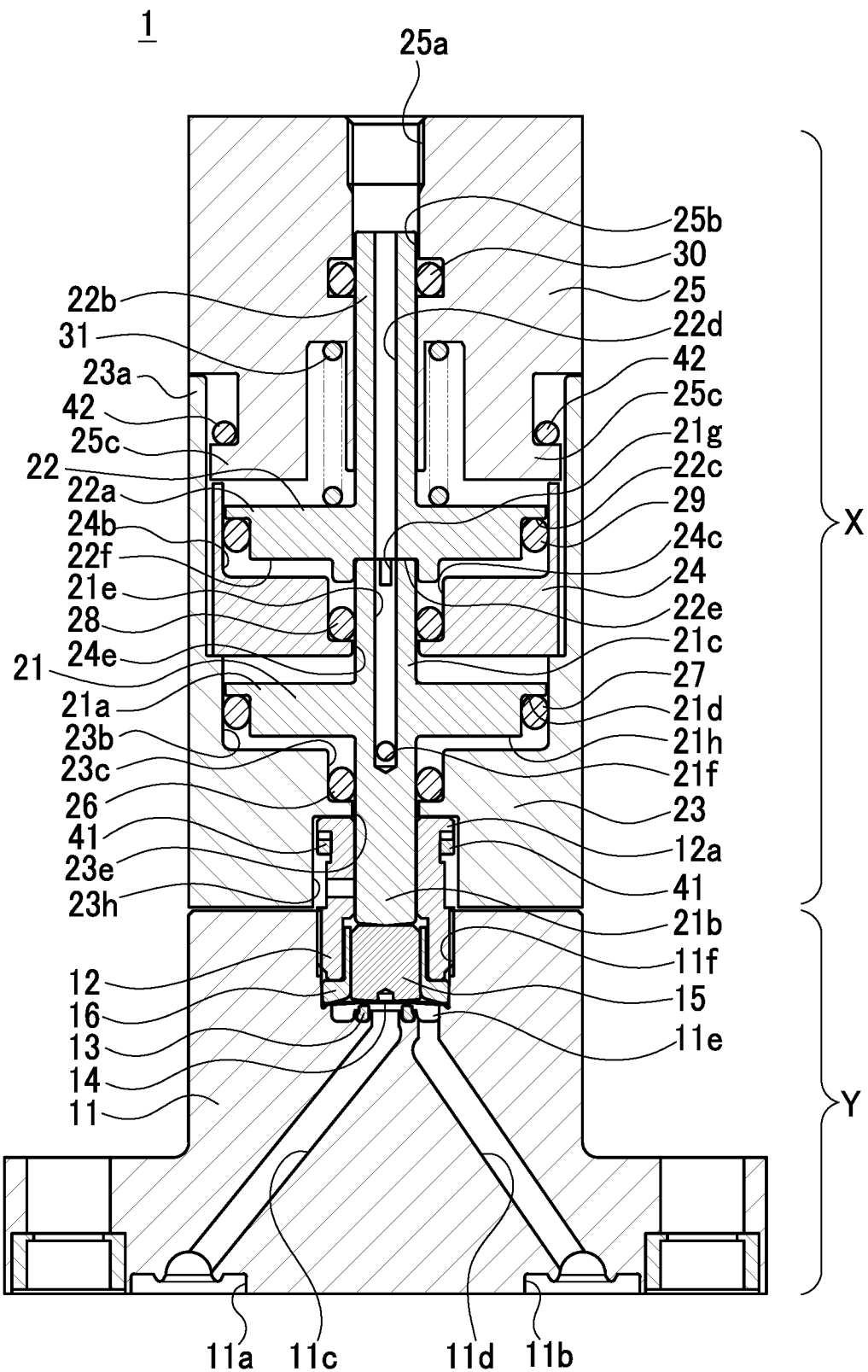
FIG. 2 is a cross-sectional view of the fluid control valve taken along A-A in FIG. 1.

The configuration of the fluid control valve 1 will be firstly described. This fluid control valve 1 includes a valve unit Y provided with an inlet port 11a and an outlet port 11b and configured to control a fluid flow and a multi-stage piston actuator unit X including a first piston 21 and a second piston 22 and configured to apply a drive force to the valve unit Y, as shown in FIGS. 1 and 2. The multi-stage piston actuator unit X has a nearly rectangular parallelepiped external shape with a thickness T1 slightly smaller than a thickness T2 of the valve unit Y. Each of the thicknesses T1 and T2 is a dimension defined in a direction (i.e., a depth direction in FIG. 2 and a direction T in FIG. 1) that is perpendicular to an imaginary line (a horizontal direction in FIG. 2, corresponding to a direction L in FIG. 1) connecting the center of the inlet port 11a and the center of the outlet port 11b, which will be mentioned later, and perpendicular to a sliding direction (in a vertical direction in FIG. 2, corresponding to a direction S in FIG. 1) of the second piston 22. The multi-stage piston actuator unit X is coupled to the valve unit Y.

The valve unit Y includes a body 11 and an adaptor 12 as shown in FIG. 2. The body 11 is formed with the inlet port 11a configured to allow a control fluid to flow in the valve unit Y and the outlet port 11b configured to allow the control fluid to flow out of the valve unit Y, those ports 11a and 11b opening on a lower surface (a bottom surface in FIG. 2) of the body 11. The inlet port 11a and the outlet port 11b communicate with each other through an inflow passage 11c, a valve chamber 11e, and an outflow passage 11d, each formed in the body 11.

The body 11 is further formed with a mounting hole 11f in which the adaptor 12 is threadedly engaged, the mounting hole 11f opening on an upper surface (a top surface in FIG. 2) of the body 11.

In a bottom surface of the mounting hole 11f, a valve seat 13 is fixed by press-fit and a diaphragm valve element 14 is placed to cover over the valve seat 13. The diaphragm valve element 14 has a disk shape that smoothly curves upward. An upwardly curving portion of the diaphragm valve element 14 is elastically deformable downward so as to come into contact with the valve seat 13. When the diaphragm valve element 14 contacts with the valve seat 13, the inflow passage 11c and the valve chamber 11e are disconnected from each other. In contrast, when the diaphragm valve element 14 returns to an undeformed state, that is, when the diaphragm valve element 14 separates from the valve seat 13, the inflow passage 11c and the valve chamber 11e are brought into communication with each other.

The diaphragm valve element 14 is fixed in such a way that the outer circumferential portion of an upper surface of the diaphragm valve element 14 is in contact with a lower surface of a valve-element retainer 16, and pressed from above, through the valve-element retainer 16, by the adaptor 12 threadedly engaged in the mounting hole 11f of the body 11.

The valve-element retainer 16 has a cylindrical shape in which a columnar stem 15 is slidably held. The stem 15 is placed in contact with the central portion of the upper surface of the diaphragm valve element 14.

The adaptor 12 is provided with a flange portion 12a at an upper end and is coupled to the multi-stage piston actuator unit X with square pins 41 inserted in square-pin through holes 23f provided in a lower end of a first cylinder 23 which will be mentioned later.

The multi-stage piston actuator unit X includes the first cylinder 23, a second cylinder 24, and a cap 25 as shown in FIGS. 1 and 2. Each of the first cylinder 23, the second cylinder 24, and the cap 25 is a molded component made of PPS resin. Such a resin-molded component can be mass-produced with a mold and hence a manufacturing cost thereof can be reduced.

The first cylinder 23 has a nearly angular-U shaped cross-section as shown in FIG. 2 including holder portions 23a protruding from a surface (hereinafter, an upper surface) of the first cylinder 23 at both ends in an extending direction of the imaginary line (i.e., a longitudinal direction) connecting the center of the inlet port 11a and the center of the outlet port 11b, the surface being located on an opposite side to the side of the first cylinder 23 coupled to the valve unit Y. Each of the holder portions 23a has an inner surface serving as a holding surface 23d which has a circular-arc shape when seen from above, i.e., which is formed as a concave face, to hold the second cylinder 24. The first cylinder 23 is formed with a first piston chamber 23b located between the holder portions 23a and configured to open on an upper surface of the first cylinder 23 so that the first piston 21 is installed therein. The first piston chamber 23b is provided, in its bottom, with a recessed portion 23c in which an O-ring 26 is mounted. The recessed portion 23c is formed, in its bottom, with a through hole 23e through which a piston rod 21b of the first piston 21 is inserted. The first cylinder 23 includes an adaptor insertion groove 23h opening on a lower surface of the first cylinder 23 to allow an upper end portion of the adaptor 12 to be inserted therein.

The second cylinder 24 includes held surfaces 24d each of which has a circular-arc shape when seen from above, i.e., which is formed as a convex face, the held surfaces 24d being located at both ends in the direction L of the imaginary line connecting the center of the inlet port 11a and the center of the outlet port 11b (i.e., in the longitudinal direction), so that the held surfaces 24d are held by the holding surfaces 23d of the first cylinder 23. Since the circular-arc holding surfaces 23d and the circular-arc held surfaces 24d combined with each other, the second cylinder 24 is positioned in place not only in the longitudinal direction (the long axis direction) but also in the lateral direction (the short axis direction). Furthermore, the second cylinder 24 is formed with a second piston chamber 24b which opens on the upper surface of the second cylinder 24. In this second piston chamber 24b, the second piston 22 is installed. The second piston chamber 24b is provided, in its bottom, with a recessed portion 24c in which an O-ring 28 is mounted. The recessed portion 24c is formed, in its bottom, with a through hole 24e through which a piston rod 21c of the first piston 21 is inserted.

The cap 25 is provided with a supply and exhaust port 25a that opens on the upper surface of the cap 25 to supply and exhaust an operating fluid. The supply and exhaust port 25a allows a one-touch joint (not shown) to be threadedly engaged therein. When an air tube is further connected to the one-touch joint, an operating fluid is supplied to or exhausted from the multi-stage piston actuator unit X through the supply and exhaust port 25a.

The cap 25 further includes a through hole 25b communicating with the supply and exhaust port 25a. In the through hole 25b, a piston rod 22b of the second piston 22 is placed by insertion from bottom of the cap 25. An O-ring 30 is placed between the outer peripheral surface of the piston rod 22b and the inner surface of the through hole 25b to prevent an operating fluid supplied through the supply and exhaust port 25a from leaking into an area other than a pressurizing chamber mentioned later in the multi-stage piston actuator unit X. Moreover, the cap 25 is provided, at its lower end, with a pair of locking portions 25c protruding outward on opposite sides from each other in the direction L. Each of the locking portions 25c engages with a round pin 42 inserted in a round-pin through hole 23g provided in an upper end portion of each holder portion 23a of the first cylinder 23.

Figure 3:
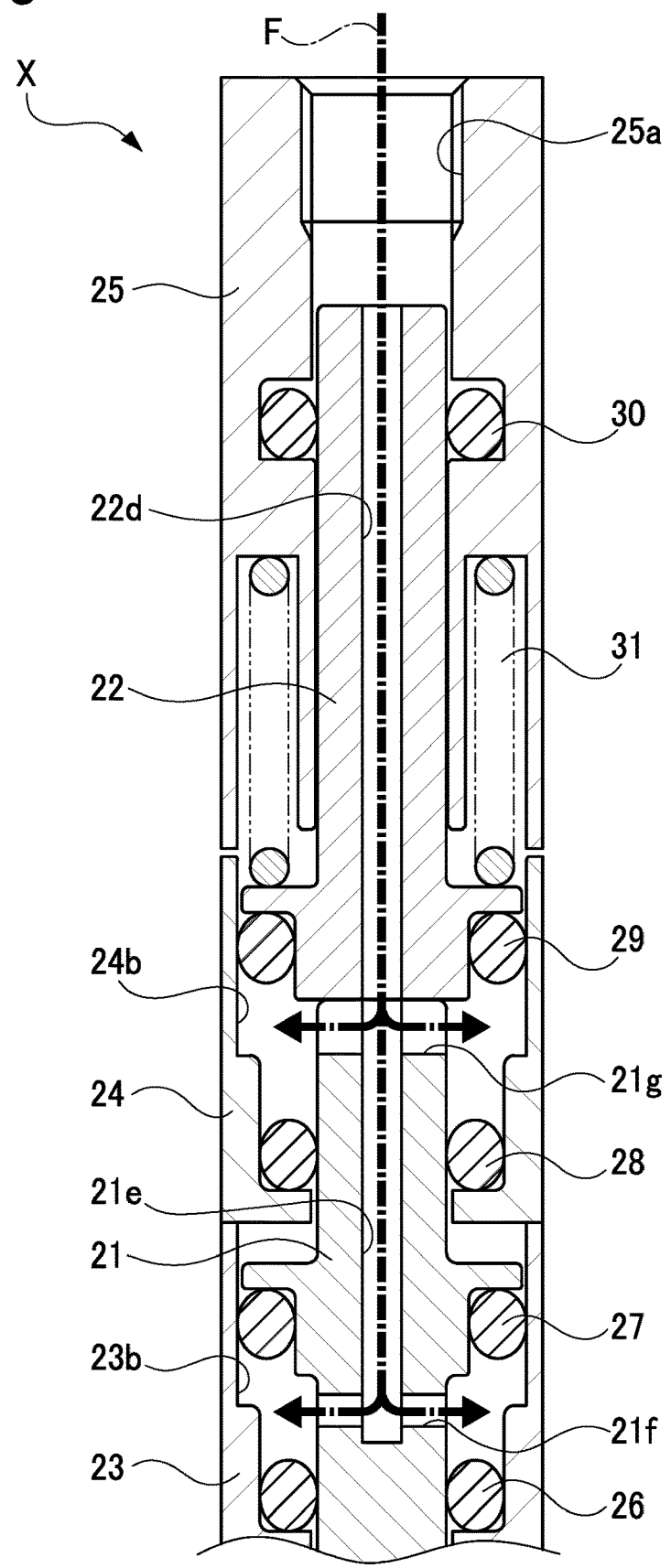
FIG. 3 is a cross-sectional view of the fluid control valve taken along B-B in FIG. 1, showing an enlarged view of a multi-stage piston actuator unit.

In the multi-stage piston actuator unit X, as shown in FIGS. 2 and 3, the first piston 21 installed in the first piston chamber 23b and the second piston 22 installed in the second piston chamber 24b are coaxially arranged in series. This coaxial arrangement means a concentric arrangement. Each of the first piston 21 and the second piston 22 is a molded component made of PPS resin. The conventional fluid control valve 100 shown in FIG. 7 incorporates the pistons 101 produced by machining and thus is high in manufacturing cost. In contrast, the fluid control valve 1 in the present disclosure incorporates the resin-molded pistons, resulting in a reduced manufacturing cost.

The second piston 22 is slidably installed in the second piston chamber 24b, thereby dividing the piston chamber 24b into two cavities. One of the two cavities, located under the second piston 22, i.e. on a lower side in FIG. 2, serves as a pressurizing chamber in which an operating fluid flows. On the upper surface of the second piston 22, i.e. on an upper side in FIG. 2, a spring 31 is placed coaxial with the second piston 22 to urge the second piston 22 in a valve closing direction, that is, downward in FIG. 2.

Figure 5A:
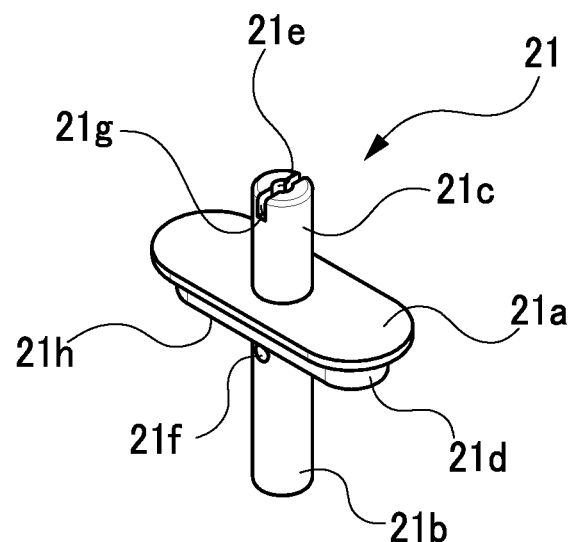
FIG. 5A is an external perspective view of a first piston.
Figure 5B:
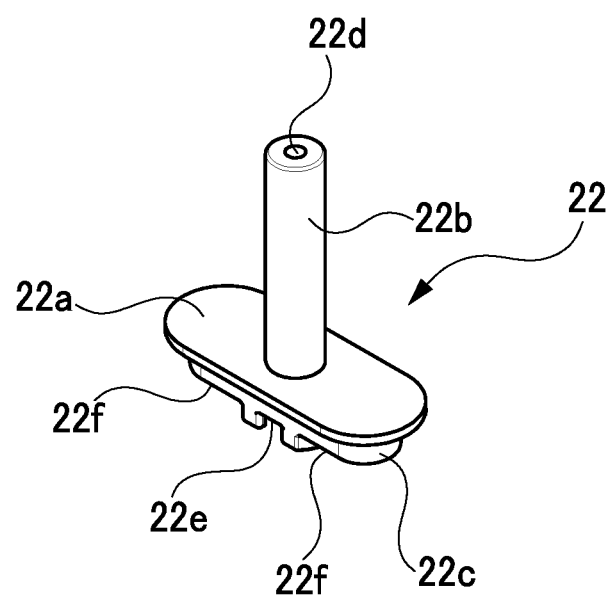
FIG. 5B is an external perspective view of a second piston.

The second piston 22 is an integrally-molded component including a piston portion 22a and the piston rod 22b as shown in FIG. 5B. The piston portion 22a has an elliptic cross-section taken perpendicular to the sliding direction S, the outer circumferential length of which is slightly smaller than the inner circumferential length of the second piston chamber 24b.

The piston portion 22a is provided, on its outer peripheral surface, with a mounting groove 22c in which an O-ring 29 made of an elastic body such as rubber is mounted. The O-ring 29 has an inner circumferential length smaller than an outer circumferential length of the mounting groove 22c to prevent the O-ring 29 mounted in the mounting groove 22c from dropping off therefrom.

The second piston 22 is formed, in its lower surface, with a recess 22e with which an upper end face of the piston rod 21c of the first piston 21 contacts. The second piston 22 further includes pressure-receiving surfaces 22f located on both sides of the recess 22e to receive the pressure occurring when an operating fluid is supplied to the pressurizing chamber. The second piston 22 further includes an internal passage 22d extending in the axial direction of the piston rod 22b.

The first piston 21 is slidably installed in the first piston chamber 23b to divide the first piston chamber 23b into two cavities. One of the two cavities, located under the first piston 21, i.e. on a lower side in FIG. 2, serves as a pressurizing chamber.

The first piston 21 is an integrally-molded component including a piston portion 21a and piston rods 21b and 21c as shown in FIG. 5A. The piston portion 21a has an elliptic cross-section taken perpendicular to the sliding direction S, the outer circumferential length of which is slightly smaller than the inner circumferential length of the first piston chamber 23b.

The piston portion 21a is provided, on its outer peripheral surface, with a mounting groove 21d in which an O-ring 27 made of an elastic body such as rubber is mounted. The O-ring 27 has an inner circumferential length designed to be smaller than an outer circumferential length of the mounting groove 21d to prevent the O-ring 27 mounted in the mounting groove 21d from dropping off therefrom. The piston portion 21a includes a pressure-receiving surface 21h as a lower surface, to receive the pressure occurring when an operating fluid is supplied to the pressurizing chamber.

The first piston 21 further includes an internal passage 21e extending in the axial direction of the piston rods 21b and 21c. The piston rod 21b is provided with a flow passage 21f radially extending across the outer peripheral surface of the piston rod 21b and the internal passage 21e. The flow passage 21f communicates with the internal passage 21e and the pressurizing chamber of the first piston chamber 23b as shown in FIG. 3. The piston rod 21c is provided with a flow passage 21g on an upper end of the piston rod 21c. This flow passage 21g communicates with the internal passage 21e and the pressurizing chamber of the second piston chamber 24b as shown in FIG. 3.

The supply and exhaust port 25a of the cap 25 communicates with the second piston chamber 24b via the internal passage 22d of the second piston 22 and the flow passage 21g of the first piston 21 and also communicates with the first piston chamber 23b via the internal passage 22d of the second piston 22, the internal passage 21e of the first piston 21, and the flow passage 21f of the first piston 21. Accordingly, when an operating fluid is supplied to the supply and exhaust port 25a, the operating fluid flows in the pressurizing chamber of the first piston chamber 23b and the pressurizing chamber of the second piston chamber 24b as indicated by arrows F in FIG. 3.

The pressurizing chamber of the first piston chamber 23b is hermetically closed by the O-ring 26 compressed between the outer peripheral surface of the piston rod 21b and the inner peripheral surface of the recessed portion 23c provided on the bottom of the first piston chamber 23b and the O-ring 27 compressed between the outer peripheral surface of the piston portion 21a and the inner peripheral surface of the first piston chamber 23b. Accordingly, when an operating fluid is supplied to the pressurizing chamber, the pressure in the pressurizing chamber rises, pushing upward the first piston 21.

The pressurizing chamber of the second piston chamber 24b is hermetically closed by the O-ring 28 compressed between the outer peripheral surface of the piston rod 21c of the first piston 21 and the inner peripheral surface of the recessed portion 24c provided in the bottom of the second piston chamber 24b and the O-ring 29 compressed between the outer peripheral surface of the piston portion 22a and the inner peripheral surface of the second piston chamber 24b. Accordingly, when an operating fluid is supplied to the pressurizing chamber, the pressure in the pressurizing chamber rises, pushing upward the second piston 22.

The lower end surface of the piston rod 21b of the first piston 21 is in contact with the upper end surface of the stem 15. The upper end surface of the piston rod 21c of the first piston 21 is in contact with the recess 22e of the second piston 22. Furthermore, since the spring 31 urges the second piston 22 in a valve closing direction, the biasing force of the spring 31 acts as the force to bring the diaphragm valve element 14 into contact with the valve seat 13 through the second piston 22, the first piston 21, and the stem 15, that is, as the sealing force to place the fluid control valve 1 in a valve closed state. On the other hand, when an operating fluid is supplied to the pressurizing chamber of the first piston chamber 23b and the pressurizing chamber of the second piston chamber 24b and then the sum of the thrust generated by the pressure acting on the pressure-receiving surface 21h of the first piston 21 and the thrust generated by the pressure acting on the pressure-receiving surface 22f of the second piston 22 exceeds the biasing force (the sealing force) of the spring 31, the first piston 21 and the second piston 22 start to move upward, thereby placing the fluid control valve 1 in a valve open state.

To reliably open the fluid control valve 1, it is necessary to provide sufficient thrusts of the first piston 21 and the second piston 22 against the biasing force of the spring 31. The thrust is determined by the pressure of the operating fluid and the area of each of the pressure-receiving surfaces 21h and 22f. Therefore, when each area of the pressure-receiving surfaces 21h and 21f is set larger, the sufficient thrust can be easily obtained.

Figure 7:
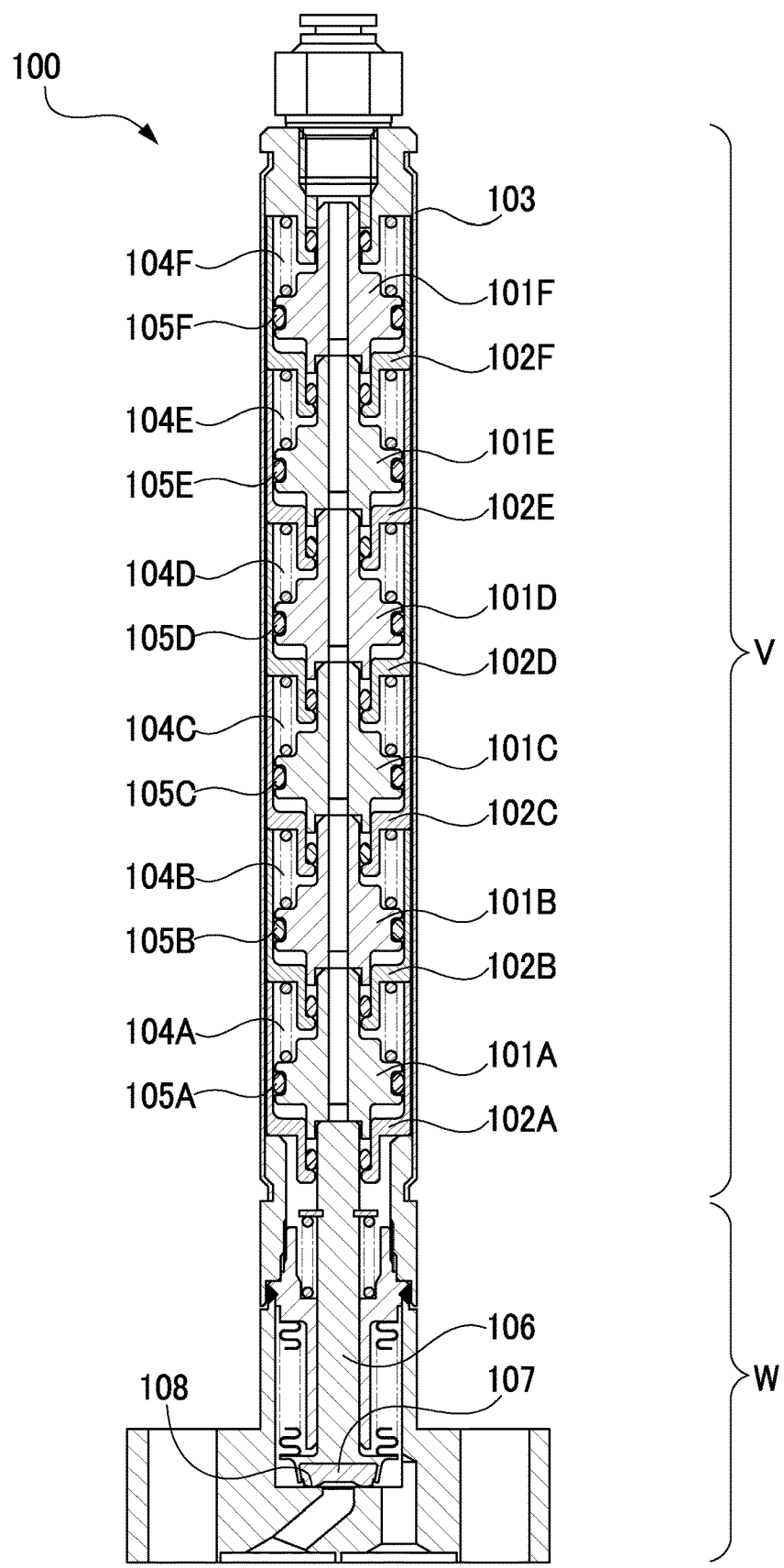
FIG. 7 is a cross-sectional view of a conventional fluid control valve.

Conventionally, the pistons 101 are installed within the cylinders 102 fixed in the hollow part of the housing 103 as shown in FIG. 7. Thus, the outer diameter of each piston 101 is smaller than a value calculated by subtracting the thickness of the housing 103 and the thickness of the cylinder 102 from the diameter of the actuator unit V, that is, than the dimension of the piston chamber. In the present embodiment, in contrast, the multi-stage piston actuator unit X is constituted of the first cylinder 23 and the second cylinder 24, so that the first piston chamber 23b and the second piston chamber 24b are easily designed to be wider than the conventional ones. Specifically, the outside dimension of the first piston 21 and the second piston 22 has only to be equal to or less than a value obtained by subtracting only the thickness of the first cylinder 23 or the second cylinder 24 from the outside dimension of the multi-stage piston actuator unit X. Therefore, the thickness of the multi-stage piston actuator unit X in the present embodiment is equivalent to the diameter of the conventional actuator unit V; however, the outside dimension of the first piston 21 and the second piston 22 in the short-side direction can be set larger than the diameter of the conventional piston 101. This configuration can provide the pressure-receiving surfaces 21h and 22f with a larger area than the conventional one and thus can easily produce the sufficient thrust of the piston against the biasing force of the spring 31. Since the piston chambers 23b and 24b can be designed larger than the conventional ones, the piston rods 21b, 21c, and 22b can be thicker than the conventional ones, leading to enhanced strength.

Since the cross-section of each of the first piston 21 and the second piston 22, taken perpendicular to the sliding direction S, is elliptic, each piston 21 and 22 can have a larger outside dimension than the conventional piston 101. This can easily provide the pressure-receiving surfaces 21h and 22f with a larger area than the conventional one and thus can easily produce the sufficient thrust of the piston against the biasing force of the spring 31.

In the present embodiment, the area of each of the pressure-receiving surface 21h of the first piston 21 and the pressure-receiving surface 22f of the second piston 22 is three times larger than that of the conventional piston 101. Thus, the first piston 21 and the second piston 22 stacked in two stages in the present embodiment can provide the thrust equivalent to the thrust obtained by the conventional pistons 101 stacked in six stages. Since the number of stacked pistons in the present embodiment is smaller than the conventional one, the fluid control valve 1 can be manufactured with the smaller number of components, resulting in a reduced product cost.

Herein, the spring 31 is a coil spring and thus may apply a nonuniform biasing force onto the second piston 22. In the case of the second piston 22 having an elliptic cross-section, the nonuniform biasing force of the spring 31 acting on the second piston 22 may likely cause the axis CL22 of the second piston 22 to tilt relative to the proper axis CL1. If the axis CL22 of the second piston 22 is tilted, the compression rate of the O-ring 29 compressed for sealing between the outer peripheral surface of the second piston 22 and the inner surface of the second piston chamber 24b becomes nonuniform without being equal over the entire circumference. Such a nonuniform compression rate of the O-ring 29 may cause excessive compression of the O-ring 29, resulting in deformation and deterioration in durability of the O-ring 29.

In contrast, the second cylinder 24 in the present disclosure is configured such that the held surfaces 24d of the second cylinder 24 are held apart from the holding surfaces 23d of the first cylinder 23 with gaps C1 and C2 therebetween as shown in FIG. 6A, so that the second cylinder 24 is held with flexibility in the longitudinal direction (the direction L in FIG. 1). Accordingly, even if the biasing force of the spring 31 acting on the second piston 22 installed in the piston chamber 24b of the second cylinder 24 becomes unbalanced, causing the axis CL22 of the second piston 22 to tilt relative to the proper center axis CL1, the second cylinder 24 can follow the tilting of the second piston 22 and thus the nonuniformity of the compression rate of the O-ring 29 can be reduced. For instance, in the example shown in FIG. 6B in which the axis CL22 of the second piston 22 tilts to the left in the figure relative to the proper center axis CL1, the second cylinder 24 moves to the right in the figure, that is, the gap C1 decreases, so that the second cylinder 24 follows the tilting of the second piston 22. Since the second cylinder 24 moves to follow the tilting of the second piston 22, this movement can prevent the O-ring 29 from getting deformed at a nonuniform compression rate, thereby preventing the excessive compression of the O-ring 29 leading to deformation and deterioration in durability of the O-ring 29.

Next, the way of assembling the multi-stage piston actuator unit X will be described below. Firstly, the O-ring 27 is mounted in the mounting groove 21d of the first piston 21 and the O-ring 29 is mounted in the mounting groove 22c of the second piston 22. The spring 31 is slipped over the piston rod 22b of the second piston 22. Further, the O-ring 26 is mounted in the recessed portion 23c of the first cylinder 23 and the O-ring 28 is mounted in the recessed portion 24c of the second cylinder 24.

Figure 4A:
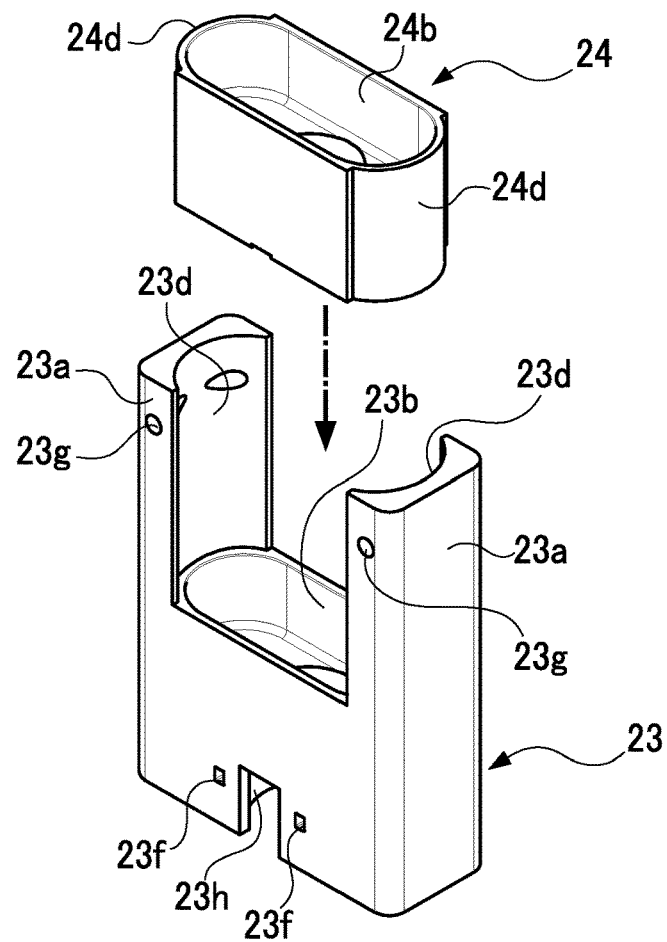
FIG. 4A is an external perspective view of a first cylinder and a second cylinder.
Figure 4B:
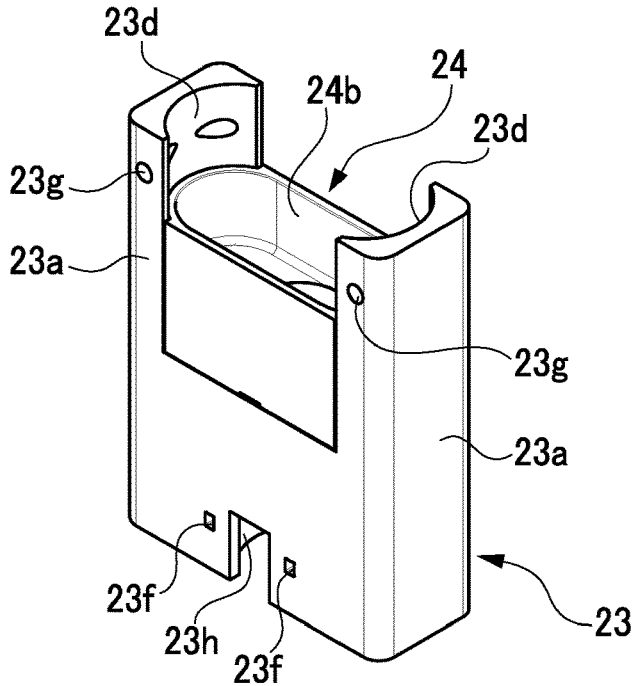
FIG. 4B is a perspective view of the first cylinder and the second cylinder in their assembled state.

Subsequently, the first piston 21 is installed in the first piston chamber 23b of the first cylinder 23. Then, the second cylinder 24 is assembled in between the holder portions 23a from above the first cylinder 23 as shown in FIG. 4A and placed in a state shown in FIG. 4B. Although this assembling is performed after installing the first piston 21 in the first piston chamber 23b, the first piston 21 is not shown in FIG. 4 for convenience.

The second piston 22 is installed in the piston chamber 24b of the second cylinder 24. After that, the cap 25 is attached from above and the round pins 42 are inserted in the round-pin through holes 23g of the first cylinder 23 to fix the cap 25. By the above manner, the multi-stage piston actuator unit X is completely assembled. This multi-stage piston actuator unit X, which is smaller in the number of components than the conventional multi-stage piston actuator unit, can be easily assembled with reduced man-hours.

The multi-stage piston actuator unit X assembled as above is connected to the valve unit Y to complete the fluid control valve 1. The multi-stage piston actuator unit X is fixed to the valve unit Y in such a way as to put the adaptor 12 of the valve unit Y in the adapter insertion groove 23h formed in the lower end face of the first cylinder 23, and then insert the square pins 41 in the square-pin insertion holes 23f so that the square pins 41 are engaged with the flange portion 12a of the adapter 12.

Next, operations of the fluid control valve 1 will be described below. In the fluid control valve 1, while no operating fluid is supplied to the supply and exhaust port 25a, the second piston 22 is being pushed down in the valve closing direction (downward in the figure) by the elastic force of the spring 31, thereby elastically deforming the diaphragm valve element 14 downward through the first piston 21 and the stem 15. The elastically deformed diaphragm valve element 14 is thus in contact with the valve seat 13, so that a control fluid supplied into the inlet port 11a is blocked from flowing to the outlet port 11b.

When an operating fluid is supplied to the supply and exhaust port 25a, the operating fluid flows in the pressurizing chamber of the second piston chamber 24b via the internal passage 22d of the second piston 22 and the flow passage 21g of the first piston 21 and also flows in the pressurizing chamber of the first piston chamber 23b via the internal passage 22d, the internal passage 21e, and the flow passage 21f. When the operating fluid flows in the pressurizing chamber of the first piston chamber 23b and the pressurizing chamber of the second piston chamber 24b, the pressure in each of the pressurizing chambers rises because each pressurizing chamber is hermetically closed with the O-rings 26, 27, 28, and 29. When the sum of the pressure acting on the pressure-receiving surface 21h of the first piston 21 and the pressure acting on the pressure-receiving surface 22f of the second piston 22 exceeds the elastic force of the spring 31, the first piston 21 and the second piston 22 start to move upward. As the first piston 21 and the second piston 22 move upward, the pressure applied on the stem 15 from above is eliminated, thus allowing the diaphragm valve element 14 having been elastically deformed to return to a previous undeformed form while pushing up the stem 15. This diaphragm valve element 14 separates from the valve seat 13. In this state, when a control fluid is supplied to the inlet port 11a, the control fluid passes through the inflow passage 11c, the valve chamber 11e, and the outflow passage 11d, and then flows out through the outlet port 11b.

In the foregoing embodiment, the cross-section of each of the first piston 21 and the second piston 22 taken perpendicular to the sliding direction S is elliptic, but may be oval or oblong.

In a case where a first piston 21 and a second piston 22 are designed with an oval cross-section, respective pressure-receiving surfaces are smaller in area than the pressure-receiving surface of an elliptic piston whose lengths in the longitudinal direction (i.e., the long axis direction) and in the lateral direction (i.e., the short axis direction) are equal to those of the oval piston. However, those oval pistons 21 and 22 can provide the following advantages when they are respectively attached with the O-rings 27 and 29.

The inner circumferential length of each of the O-rings 27 and 29 is set smaller than the outer circumferential length of each of the mounting grooves 21d and 22c to prevent drop-off of the O-rings 27 and 29 from the corresponding mounting grooves 21d and 22c. Those O-rings 27 and 29 respectively mounted in the mounting grooves 21d and 22c are stretched to fit with the outer circumferential length of the corresponding mounting grooves 21d and 22c.

In the case of the elliptic first piston 21 and the second piston 22 each having an elliptic cross-section, the O-rings 27 and 29 attached to corresponding pistons 21 and 22 may be stretched at a nonuniform stretch rate over the entire circumference. Thus, when the O-rings 27 and 29 attached to the elliptic pistons 21 and 22 are compressed respectively between the groove surface of the mounting groove 21d (i.e., the outer peripheral surface of the piston portion 21a) and the inner surface of the piston chamber 23b and between the groove surface of the mounting groove 22c (i.e., the outer peripheral surface of the piston portion 22a) and the inner surface of the piston chamber 24b, the compression rates of the O-rings 27 and 29 may become nonuniform. In contrast, the oval first piston 21 and second piston 22 each having an oval cross-section can advantageously reduce the nonuniformity of the stretch rate and thus the nonuniformity of the compression rate.

The fluid control valve 1 in the present embodiment described above specifically provides the following operations and effects.

(1) The fluid control valve 1 includes the multi-stage piston actuator unit X including a plurality of pistons (the first piston 21 and the second piston 22) arranged coaxially and slidably within the actuator unit X, and the valve unit Y provided with the inlet port 11a allowing a control fluid to flow in the valve unit Y and the outlet port 11b allowing the control fluid to flow out of the valve unit Y. The first piston 21 and the second piston 22 are slidable in the sliding direction S perpendicular to the imaginary line connecting the center of the inlet port 11a and the center of the outlet port 11b. The multi-stage piston actuator unit X has the thickness T1 defined in the direction that is perpendicular to the imaginary line (the direction L) connecting the center of the inlet port 11a and the center of the outlet port 11b and also perpendicular to the sliding direction S, the thickness T1 being equal to or smaller than the thickness T2 of the valve unit Y in the direction that is perpendicular to the imaginary line and also perpendicular to the sliding direction S. The first piston 21 and the second piston 22 have either an elliptic or oval cross-section, taken perpendicular to the sliding direction S, the cross-section having a long axis extending parallel to the imaginary line. This can prevent an increase in the installation area of the fluid control valve 1 and reduce the number of components while providing sufficient thrust of the piston necessary for a valve opening operation, leading to a reduced product cost of the fluid control valve 1.

The thickness T1 of the multi-stage piston actuator unit X is equal to or less than the thickness T2 of the valve unit Y. Even when the fluid control valves 1 are disposed adjacently in the thickness direction T, as with the conventional fluid control valves 100, accordingly, the multi-stage piston actuator units X of the adjacent fluid control valves 1 do not interfere with each other, so that the fluid control valves 1 can be closely arranged without space therebetween. This can prevent an increase in the installation area of the fluid control valves 1. In even such a multi-stage piston actuator unit X with a reduced thickness, furthermore, since the first piston 21 and the second piston 22 slidable in the multi-stage piston actuator unit X are designed with an elliptic or oval cross-section taken perpendicular to the sliding direction S, the pressure-receiving surfaces 21h and 22f of the first piston 21 and second piston 22 for receiving the pressure of an operating fluid can each have a larger area than that of the conventional piston 101 having a perfect circular cross-section without influencing the thickness T1 of the multi-stage piston actuator unit X. For instance, when the area of each of the pressure-receiving surfaces 21h and 22f is set three times larger than the conventional one, the first piston 21 and second piston 22 stacked in two stages in the present disclosure can produce the thrust equal to the thrust obtained by the conventional pistons 101 stacked in six stages. Reducing the number of stages of stacked pistons while sufficiently providing the thrust required for a valve opening operation can reduce the number of components of the fluid control valve 1 and thus reduce its product cost.

In a case where the first piston 21 and the second piston 22 are designed with an oval cross-section, respective pressure-receiving surfaces 21h and 22f are smaller in area than those of the elliptic first and second pistons 21 and 22 designed with an elliptic cross-section whose long-axis length and short-axis length are equal to those of the oval cross-section. However, those oval first and second pistons 21 and 22 can provide the following advantages when they are respectively attached with the O-rings 27 and 29.

As shown in FIG. 7, for example, the O-rings 105 are conventionally fitted on the outer peripheral surfaces of the pistons 101 to hermetically close each piston chamber. The inner diameter of each O-ring 105 is generally set smaller than the outer diameter of each piston 101 in order to prevent the O-ring 105 attached to the piston 101 from dropping off therefrom. Accordingly, each O-ring 105 attached to the pistons 101 is stretched to fit with the circumferential length of the pistons 101.

Herein, in the case of the first piston 21 and the second piston 22 each having an elliptic cross-section, the O-rings 27 and 29 attached to those pistons 21 and 22 may be stretched at a nonuniform stretch rate over the entire circumference. Thus, when the O-rings 27 and 29 attached to the elliptic pistons 21 and 22 are compressed respectively between the outer peripheral surface of the first piston 21 and the inner surface of the piston chamber 23b and between the outer peripheral surface of the second piston 22 and the inner surface of the piston chamber 24b, the compression rates of the O-rings 27 and 29 may become nonuniform. In contrast, the first piston 21 and the second piston 22 each having an oval cross-section can advantageously reduce the nonuniformity of the stretch rate of the O-rings 27 and 29 and thus the nonuniformity of the compression rate.

(2) In the fluid control valve 1 described in (1), the multi-stage piston actuator unit X includes the first cylinder 23 and the second cylinder 24 arranged coaxially in the sliding direction S of the pistons (the first piston 21 and the second piston 22). The first cylinder 23 is coupled to the valve unit Y. The first cylinder 23 includes the holder portions 23a at both ends of the surface of the first cylinder 23 in the direction L of the imaginary line, the surface being located on the opposite side to the side of the first cylinder 23 coupled to the valve unit Y. The second cylinder 24 is assembled in between the holder portions 23a. This allows reduction in the number of components and thus reduce a product cost of the fluid control valve 1.

The multi-stage piston actuator unit X is constituted of the first cylinder 23 and the second cylinder 24. Specifically, this second cylinder 24 is inserted between the holder portions 23a of the first cylinder 23 so that the cylinders 23 and 24 are assembled with each other. Furthermore, this first cylinder 23 assembled with the second cylinder 24 is coupled to the valve unit Y, so that the multi-stage piston actuator unit X is connected to the valve unit Y. This configuration does not need the housing 103 to fix the cylinders 102 stacked in stages to each other and fix the multi-stage piston actuator unit X to the valve unit Y as in the conventional fluid control valve 100. Thus, the fluid control valve 1 can be provided with a reduced number of components and at a reduced product cost.

In the conventional fluid control valve 101, the pistons 101 are installed in the cylinders 102 fixed in the hollow part of the housing 103 as shown in FIG. 7. Therefore, the outer diameter of each piston 101 is smaller than a value calculated by subtracting the thickness of the housing 103 and the thickness of the cylinder 102 from the diameter of the actuator unit V. In the present disclosure, in contrast, the multi-stage piston actuator unit X is constituted of the first cylinder 23 and the second cylinder 24, so that the outside dimension of each of the first piston 21 and the second piston 22 has only to be equal to or less than a value obtained by subtracting only the thickness of the first cylinder 23 or the second cylinder 24 from the outside dimension of the multi-stage piston actuator unit X. This configuration can provide the pressure-receiving surfaces 21h and 22f of the first and second pistons 21 and 22 with a sufficiently larger area than the conventional one and thus can easily produce the sufficient thrust of the piston required for a valve opening operation.

(3) In the fluid control valve 1 described in (2), the holder portions 23a protrude, at both ends of the first cylinder 23 in the direction of the imaginary line (the longitudinal direction), from the surface of the first cylinder 23 on the opposite side to the side of the first cylinder 23 coupled to the valve unit Y. The second cylinder 24 includes end surfaces (the held surfaces 24d) at both ends in the direction of the imaginary line (the longitudinal direction) of the second cylinder 24. Those end surfaces of the second cylinder 24 are held apart, with gaps C1 and C2, from the inner surfaces (the holding surfaces 23d) of the protruding holder portions 23a. The second cylinder 24 is internally provided with the second piston chamber 24b configured to install the second piston 22 therein. The multi-stage piston actuator unit X further includes the elastic member (the spring 31) biasing the second piston 22 in the valve closing direction. The second piston 22 is provided with the O-ring 29 compressed between the outer peripheral surface of the second piston 22 and the inner wall surface of the second piston chamber 24b. The gaps C1 and C2 are provided with such a predetermined dimension as to allow the second cylinder 24 to move to follow the tilting of the axis CL22 of the second piston 22 even if the axis CL22 is tilted due to the unbalanced biasing force of the elastic member (the spring 31) acting on the second piston 22, so that the O-ring 29 is prevented from being deformed at a nonuniform compression rate. This allows prevention of excessive compression of the O-ring 29, thereby avoiding deformation and deterioration in durability of the O-ring 29.

In the conventional fluid control valve 100 shown in FIG. 7, the pistons 101 are biased in the valve closing direction by the spring 104 which is an elastic member. While no operating fluid is supplied to the actuator unit V, the fluid control valve 100 is in a valve closed state. The spring 104 is a coil spring and hence may apply an unbalanced biasing force on the upper end face of the piston 101. In the case of the second piston 22 having an elliptic or oval cross-section as described in the present disclosure, the unbalanced biasing force of the spring 31 acting on the second piston 22 may likely cause the axis CL22 of the second piston 22 to tilt. If the axis CL22 of the second piston 22 is tilted, the compression rate of the O-ring 29 compressed for sealing between the outer peripheral surface of the second piston 22 and the inner surface of the second piston chamber 24b becomes nonuniform without being equal over the entire circumference. Such a nonuniform compression rate of the O-ring 29 may cause excessive compression of the O-ring 29, resulting in deformation and deterioration in durability of the same.

Therefore, the second cylinder 24 in the present disclosure is configured such that the end surfaces (the held surfaces 24d) of the second cylinder 24 at both ends in the direction of the imaginary direction (the longitudinal direction) are held apart from the inner surfaces (the holding surfaces 23d) of the protruding holder portions 23a with the gaps, so that the second cylinder 24 is held with flexibility in the direction of the imaginary direction (the longitudinal direction). Such a second cylinder 24 held with flexibility can move to follow the tilting of the second piston 22 even if the axis CL22 of the second piston 22 is tilted due to the unbalanced biasing force of the spring 31 acting on the piston 22 installed in the piston chamber 24b of the second cylinder 24, so that the O-ring 29 is prevented from getting deformed at a nonuniform compression rate. This allows prevention of excessive compression of the O-ring 29, thereby avoiding deformation and deterioration in durability of the O-ring 29.

The foregoing embodiments are mere examples and give no limitation to the present disclosure. The present disclosure may be embodied in other specific forms without departing from the essential characteristics thereof.

For instance, the foregoing embodiment incorporates the diaphragm valve element 14 as a valve element. An alternative is to adopt a structure that the valve element 107 connected to the stem 106 shown in FIG. 7 is moved up and down to contact with or separate from the valve seat 108.

REFERENCE SIGNS LIST

11a Inlet port
11b Outlet port
21 First piston
22 Second piston
X Multi-stage piston actuator unit
Y Valve unit

What is claimed is:

1. A fluid control valve comprising:
   a multi-stage piston actuator unit including a plurality of pistons arranged coaxially and slidably within the multi-stage piston actuator unit;
   a valve unit provided with an inlet port configured to allow a control fluid to flow in the valve unit and an outlet port configured to allow a control fluid to flow out of the valve unit,
   wherein the pistons are slidable in a sliding direction perpendicular to an imaginary line connecting a center of the inlet port and a center of the outlet port,
   the multi-stage piston actuator unit has a thickness defined in a direction that is perpendicular to the imaginary line and perpendicular to the sliding direction, the thickness being equal to or smaller than a thickness of the valve unit in the direction that is perpendicular to the imaginary line and perpendicular to the sliding direction,
   the plurality of pistons has either one of an elliptic cross-section and an oval cross-section, taken perpendicular to the sliding direction, the cross-section having a long axis extending parallel to the imaginary line,
   the multi-stage piston actuator unit includes a first cylinder and a second cylinder arranged coaxially in the sliding direction of the pistons, and the first cylinder is coupled to the valve unit, the first cylinder including holder portions at both ends of a surface of the first cylinder in a direction of the imaginary line, the surface being located on an opposite side to a side of the first cylinder coupled to the valve unit, and the second cylinder is assembled in between the holder portions.

2. A fluid control valve comprising:

a multi-stage piston actuator unit including a plurality of pistons arranged coaxially and slidably within the multi-stage piston actuator unit;

a valve unit provided with an inlet port configured to allow a control fluid to flow in the valve unit and an outlet port configured to allow a control fluid to flow out of the valve unit, wherein the pistons are slidable in a sliding direction perpendicular to an imaginary line connecting a center of the inlet port and a center of the outlet port, the multi-stage piston actuator unit has a thickness defined in a direction that is perpendicular to the imaginary line and perpendicular to the sliding direction, the thickness being equal to or smaller than a thickness of the valve unit in the direction that is perpendicular to the imaginary line and perpendicular to the sliding direction, the plurality of pistons has either one of an elliptic cross-section and an oval cross-section, taken perpendicular to the sliding direction, the cross-section having a long axis extending parallel to the imaginary line, the multi-stage piston actuator unit includes a first cylinder and a second cylinder arranged coaxially in the sliding direction of the pistons, the first cylinder is coupled to the valve unit, the first cylinder including holder portions at both ends of a surface of the first cylinder in a direction of the imaginary line, the surface being located on an opposite side to a side of the first cylinder coupled to the valve unit, and the second cylinder is assembled in between the holder portions, the holder portions protrude, at the both ends of the first cylinder in the direction of the imaginary line, from the surface of the first cylinder on the opposite side to the side of the first cylinder coupled to the valve unit, the second cylinder includes end surfaces at both ends in the direction of the imaginary line, the end surfaces being held apart from inner surfaces of the holder portions with a gap, the second cylinder is internally provided with a piston chamber configured to install one of the pistons, the multi-stage piston actuator unit further includes an elastic member biasing the one piston in a valve closing direction, the one piston is provided with an O-ring compressed between an outer peripheral surface of the piston and an inner wall surface of the piston chamber, and the gap is provided with a predetermined dimension to allow the second cylinder to follow tilting of an axis of the one piston even if this axis is tilted due to an unbalanced biasing force of the elastic member acting on the one piston, so that the O-ring is prevented from being deformed at a nonuniform compression rate.

* * * * *